United States Patent
Seo et al.

(10) Patent No.: US 9,479,965 B2
(45) Date of Patent: Oct. 25, 2016

(54) METHOD FOR TERMINAL TO TRANSMIT/RECEIVE SIGNAL TO/FROM BASE STATION IN WIRELESS COMMUNICATION SYSTEM AND DEVICE THEREFOR

(75) Inventors: Hanbyul Seo, Anyang-si (KR); Hakseong Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 238 days.

(21) Appl. No.: 14/110,055

(22) PCT Filed: Apr. 18, 2012

(86) PCT No.: PCT/KR2012/002943
§ 371 (c)(1),
(2), (4) Date: Oct. 4, 2013

(87) PCT Pub. No.: WO2012/150775
PCT Pub. Date: Nov. 8, 2012

(65) Prior Publication Data
US 2014/0092921 A1  Apr. 3, 2014

Related U.S. Application Data

(60) Provisional application No. 61/482,177, filed on May 3, 2011, provisional application No. 61/482,188, filed on May 3, 2011, provisional application No. 61/509,548, filed on Jul. 19, 2011, provisional application No. 61/556,769, filed on Nov. 7, 2011, provisional application No. 61/598,309, filed on Feb. 13, 2012.

(51) Int. Cl.
*H04W 28/06* (2009.01)
*H04W 72/04* (2009.01)
(Continued)

(52) U.S. Cl.
CPC .......... *H04W 28/065* (2013.01); *H04L 5/0053* (2013.01); *H04L 27/2602* (2013.01);
(Continued)

(58) Field of Classification Search
None
See application file for complete search history.

(56) References Cited

U.S. PATENT DOCUMENTS

| | | | |
|---|---|---|---|
| 5,742,594 A * | 4/1998 | Natarajan | H04J 3/1694 370/336 |
| 8,446,886 B2 * | 5/2013 | Hu et al. | 370/335 |

(Continued)

FOREIGN PATENT DOCUMENTS

| | | | |
|---|---|---|---|
| CA | 2775479 A1 | | 3/2011 |
| KR | WO2011046349 | * | 4/2011 |

(Continued)

OTHER PUBLICATIONS

Motorola, "Exciting Alternative, Global Momentum", 2010,12 pages.

*Primary Examiner* — Jeffrey M Rutkowski
*Assistant Examiner* — Andre Tacdiran
(74) *Attorney, Agent, or Firm* — Birch, Stewart, Kolasch & Birch, LLP

(57) ABSTRACT

A method for transceiving a signal with a base station (BS) at a user equipment (UE) in a wireless communication system. A default configuration of a specific subframe is configured, and information about a dynamic configuration of the specific subframe is received from the BS. The dynamic configuration of the specific subframe indicates whether the specific subframe is configured for an uplink signal transmission or a downlink signal reception. The downlink signal reception from the BS is performed in the specific subframe, or the uplink signal transmission to the BS is performed in the specific subframe, according to the dynamic configuration of the specific subframe. A first period for the downlink signal reception is positioned at the start of the specific subframe and a second period for the uplink signal transmission is positioned at the end of the specific subframe.

6 Claims, 7 Drawing Sheets

(51) Int. Cl.
  *H04L 27/26* (2006.01)
  *H04L 5/00* (2006.01)
(52) U.S. Cl.
  CPC .......... *H04W72/0406* (2013.01); *H04L 5/001* (2013.01); *H04L 5/0023* (2013.01); *H04L 5/0037* (2013.01); *H04L 5/0048* (2013.01)

(56) References Cited

U.S. PATENT DOCUMENTS

| | | | |
|---|---|---|---|
| 2005/0124373 A1* | 6/2005 | Marinier | H04W 52/44 455/522 |
| 2005/0135284 A1* | 6/2005 | Nanda et al. | 370/294 |
| 2009/0073902 A1* | 3/2009 | Astely et al. | 370/280 |
| 2010/0027446 A1 | 2/2010 | Choi et al. | |
| 2010/0246456 A1* | 9/2010 | Suo | H04W 56/003 370/280 |
| 2010/0278080 A1* | 11/2010 | Pan | H04B 7/2656 370/280 |
| 2011/0149813 A1* | 6/2011 | Parkvall | H04B 7/2656 370/280 |
| 2011/0170562 A1* | 7/2011 | Hu et al. | 370/479 |
| 2012/0014358 A1* | 1/2012 | Pan | H04W 72/0453 370/336 |
| 2012/0188988 A1* | 7/2012 | Chung et al. | 370/335 |
| 2013/0083736 A1* | 4/2013 | Yin | H04W 72/0446 370/329 |
| 2013/0136028 A1* | 5/2013 | Gan | H04W 24/02 370/252 |
| 2015/0181612 A1* | 6/2015 | Gan | H04W 24/02 370/329 |

FOREIGN PATENT DOCUMENTS

| | | |
|---|---|---|
| WO | WO 2009/035399 A1 | 3/2009 |
| WO | WO 2009/120701 A2 | 10/2009 |
| WO | WO 2010/049587 A1 | 5/2010 |
| WO | WO 2010/056925 A1 | 5/2010 |

* cited by examiner (a)

(b)

METHOD FOR TERMINAL TO TRANSMIT/RECEIVE SIGNAL TO/FROM BASE STATION IN WIRELESS COMMUNICATION SYSTEM AND DEVICE THEREFOR

CROSS-REFERENCE TO RELATED APPLICATION

This application is the National Phase of PCT/KR2012/002943 filed on Apr. 18, 2012, which claims priority under 35 U.S.C. 119(e) to U.S. Provisional Application Nos. 61/482,177 filed on May. 3, 2011, 61/482,188 filed on May. 3, 2011, 61/509,548 filed on Jul. 19, 2011, 61/556,769 filed on Nov. 7, 2011, and 61/598,309 filed on Feb. 13, 2012, all of which are hereby expressly incorporated by reference into the present application.

TECHNICAL FIELD

The present invention relates to a method and apparatus for transmitting/receiving a signal to/from a base station by a terminal in a wireless communication system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies on a method and apparatus for transmitting/receiving a signal to/from a base station by a terminal in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for transmitting/receiving a signal to/from a Base Station (BS) at a User Equipment (UE) in a wireless communication system, including receiving information about a configuration of a specific subframe from the BS, and receiving a downlink signal from the BS in the specific subframe or transmitting an uplink signal to the BS in the specific subframe. A first period for downlink signal reception is positioned at the start of the specific subframe and a second period for uplink signal transmission is positioned at the end of the specific subframe. If the specific subframe is configured for downlink signal reception, the information about the configuration of the specific subframe defines a size of the first period in the specific subframe, and if the specific subframe is configured for uplink signal transmission, the information about the configuration of the specific subframe defines a size of the second period in the specific subframe.

In another aspect of the present invention, provided herein is a UE in a wireless communication system, including a wireless communication module configured to transmit/receive a signal to/from a BS, and a processor configured to process the signal. The wireless communication module receives information about a configuration of a specific subframe from the BS, and the processor controls the wireless communication module to receive a downlink signal from the BS in the specific subframe or to transmit an uplink signal to the BS in the specific subframe, a first period for downlink signal reception is positioned at the start of the specific subframe, and a second period for uplink signal transmission is positioned at the end of the specific subframe. If the specific subframe is configured for downlink signal reception, the information about the configuration of the specific subframe defines a size of the first period in the specific subframe, and if the specific subframe is configured for uplink signal transmission, the information about the configuration of the specific subframe defines a size of the second period in the specific subframe.

If the specific subframe is configured for uplink signal transmission, the first period may have a minimum size in the specific subframe. The minimum size of the first period may be fixed to three symbols or the BS may set the minimum size of the first period by a higher-layer signal or a physical-layer signal. Or the minimum size of the first period may be variable according to the number of antenna ports for a cell-specific reference signal transmitted by the BS.

The information about the configuration of the specific subframe may indicate whether the specific subframe is configured for uplink transmission or downlink reception.

In the embodiments of the present invention, the specific subframe may include a Downlink Pilot Time Slot (DwPTS), a Guard Period (GP), and an Uplink Pilot Time Slot (UpPTS), the first period may be the DwPTS, and the second period may be the UpPTS. A size of the GP may be fixed to one symbol.

The information about the configuration of the specific subframe may be distinguished from information about a configuration of the specific subframe for a legacy UE.

Advantageous Effects

According to the present invention, a terminal can efficiently transmit/receive a signal to/from a base station in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The technical features of the present invention as described hereinbelow can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved-UMTS (E-UMTS) using E-UTRA. 3GPP LTE employs OFDMA for downlink and SC-FDMA for uplink. LTE-A is an evolution of 3GPP LTE.

For clarity of description, the following description focuses on the 3GPP LTE/LTE-A system. However, the technical features of the present invention are not limited thereto. Specific terms used in the following description are provided to help the understanding of the present invention. These specific terms may be replaced with other terms within the scope and spirit of the present invention.

In a wireless communication system, a User Equipment (UE) receives information from an evolved Node B (eNB or eNode B) on a DownLink (DL) and transmits information to the eNB on an UpLink (UL). Data and various types of control information are transmitted and received between the eNB and the UE and there are various physical channels according to the types/usages of the transmitted and received data and control information.

Figure 1:
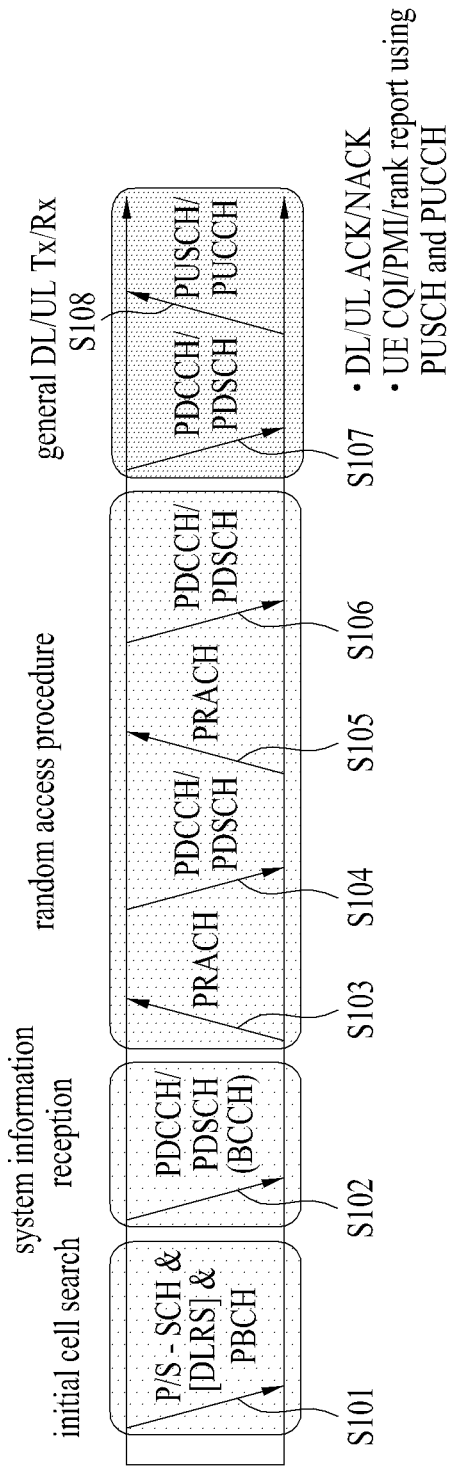
FIG. 1 illustrates physical channels and a general signal transmission method using the physical channels in a $3^{rd}$ Generation Partnership Project Long Term Evolution (3GPP LTE) system as an exemplary wireless communication system.

FIG. 1 illustrates physical channels and a general method for transmitting signals on the physical channels in a 3GPP LTE system.

Referring to FIG. 1, when a UE is powered on or enters a new cell, the UE performs initial cell search (S101). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in a cell of the eNB by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S102).

Then to completely access the eNB, the UE may perform a random access procedure with the eNB as in steps S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE may additionally perform a contention resolution procedure including transmission of an additional PRACH (S105) and reception of a PDCCH and a PDSCH associated with the PDCCH (S106).

After the above procedure, the UE may receive a PDCCH and/or a PDSCH from the eNB (S107) and transmit a Physical Uplink Shared Channel (PUSCH) and/or a Physical Uplink Control Channel (PUCCH) to the eNB (S108), which is a general DL and UL signal transmission procedure. Control information that the UE transmits to the eNB is called Uplink Control Information (UCI). The UCI includes a Hybrid Automatic Repeat reQuest ACKnowledgment/Negative ACKnowledgment (HARQ ACK/NACK), a Scheduling Request (SR), Channel State Information (CSI), etc. In the present disclosure, an HARQ ACK/NACK is referred to shortly as an HARQ-ACK or ACK/NACK (A/N). CSI includes a Channel Quality Indicator (CQI), a Precoding Matrix Index (PMI), a Rank Indication (RI), etc. While UCI is transmitted generally on a PUCCH, if control information and traffic data are to be transmitted simultaneously, the UCI may be transmitted on a PUSCH. The UCI may be transmitted aperiodically on the PUSCH upon request/command of a network.

Figure 2A:
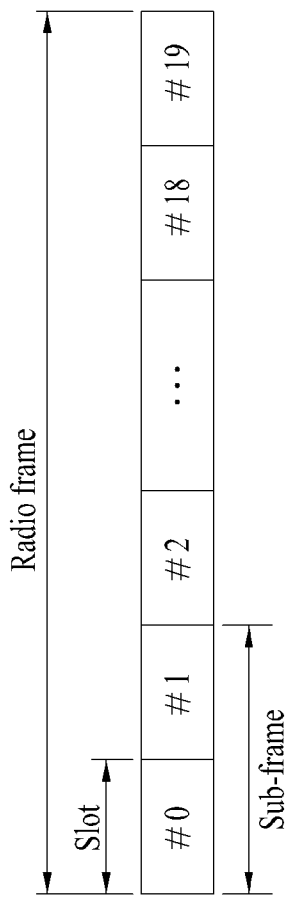
FIG. 2a illustrates a structure of a radio frame.
Figure 2A:
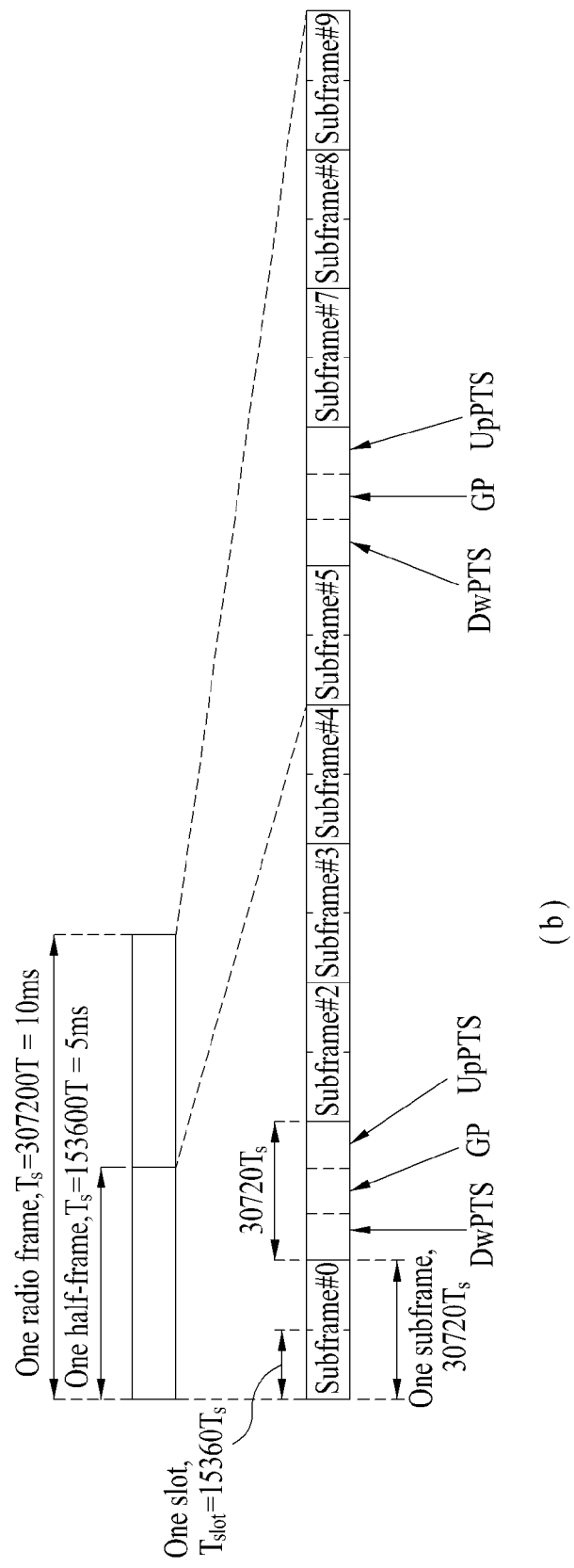

FIG. 2a illustrates an exemplary structure of a radio frame. In a cellular Orthogonal Frequency Division Multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

(a) of FIG. 2a is a diagram illustrating the structure of the type 1 radio frame. A DL radio frame includes 10 subframes, each subframe including two slots in the time domain. A time required for transmitting one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since the 3GPP LTE system uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is instable as is the case with a fast UE, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

(b) of FIG. 2a illustrates the structure of the type 2 radio frame. The type 2 radio frame includes two half frames, each half frame including four general subframes each having two slots and one special subframe including a Downlink Pilot Time Slot (DwPTS), a Guard Period (GP), and an Uplink Pilot Time Slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or an SRS. The GP is used to cancel UL interference between UL and DL, caused by the multi-path delay of a DL signal.

A current 3GPP standard specification defines the following configurations listed in [Table 1] below for the special subframe. [Table 1] illustrates DwPTSs and UpPTSs in the case where $T_s=1/(15000 \times 2048)$. The remaining region except for a DwPTS and an UpPTS is set as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL subframe configurations for the type 2 radio frame, that is, for a TDD system are listed in [Table 2] below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 2], D represents a DL subframe, U represents a UL subframe, and S represents a special subframe. [Table 2] further tabulates DL-to-UL switch point periodicities for the respective UL/DL subframe configurations in the system.

The above-described structures of radio frames are only exemplary. Accordingly, the number of subframes in a radio frame, the number of slots in a subframe, and the number of symbols in a slot may be changed in various manners.

Figure 2B:
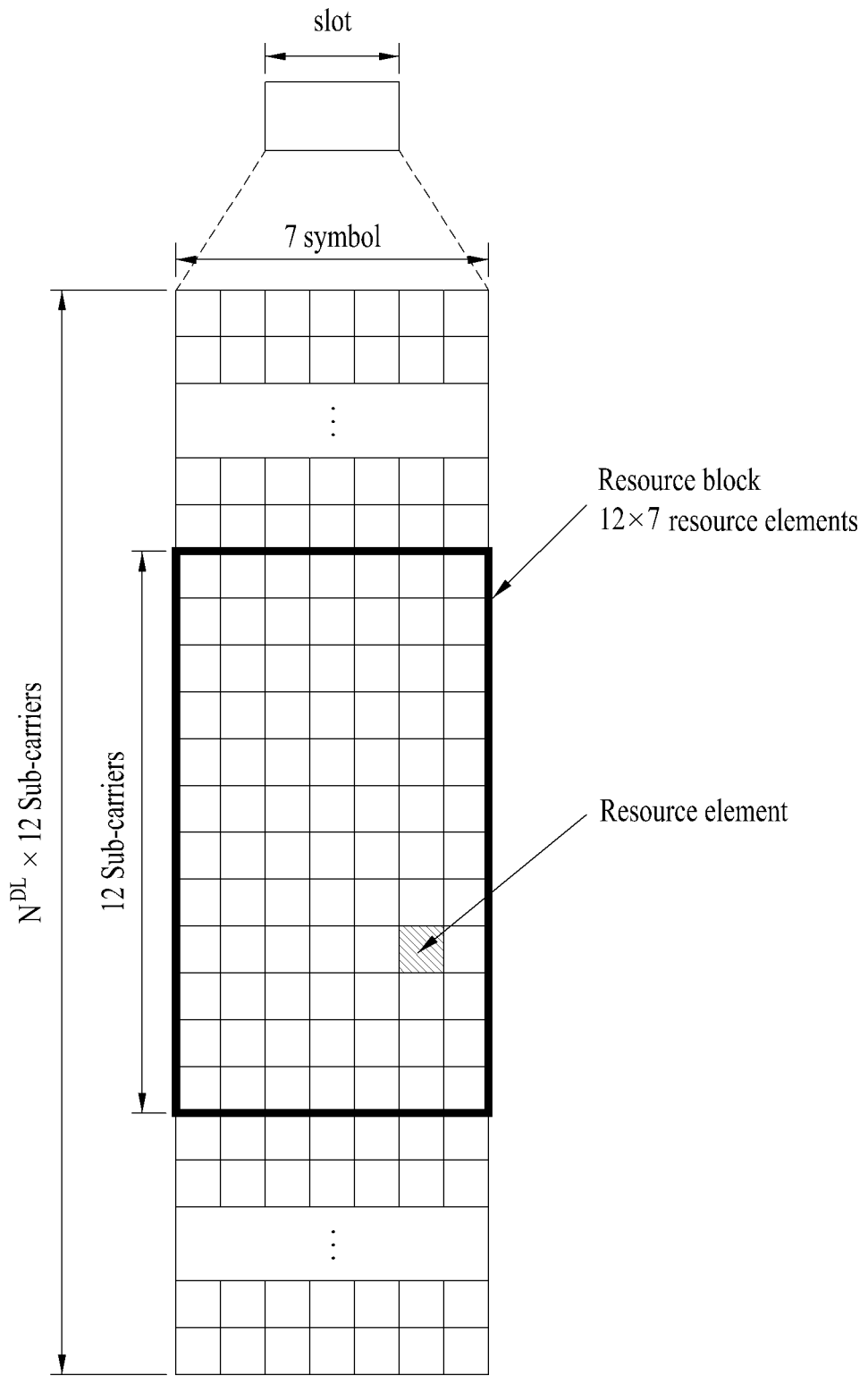
FIG. 2b illustrates a structure of a downlink resource grid for the duration of one downlink slot.

FIG. 2B illustrates the structure of a DL resource grid for the duration of one DL slot.

Referring to FIG. 2B, a DL slot includes a plurality of OFDM symbols in the time domain. One DL slot includes 7(6) OFDM symbols in the time domain and an RB includes 12 subcarriers in the frequency domain. Each element of the resource grid is referred to as a Resource Element (RE). An RB includes 12×7(6) REs. The number of RBs in a DL slot, $N_{RB}$ depends on a DL transmission bandwidth. A UL slot may have the same structure as a DL slot.

Figure 3:
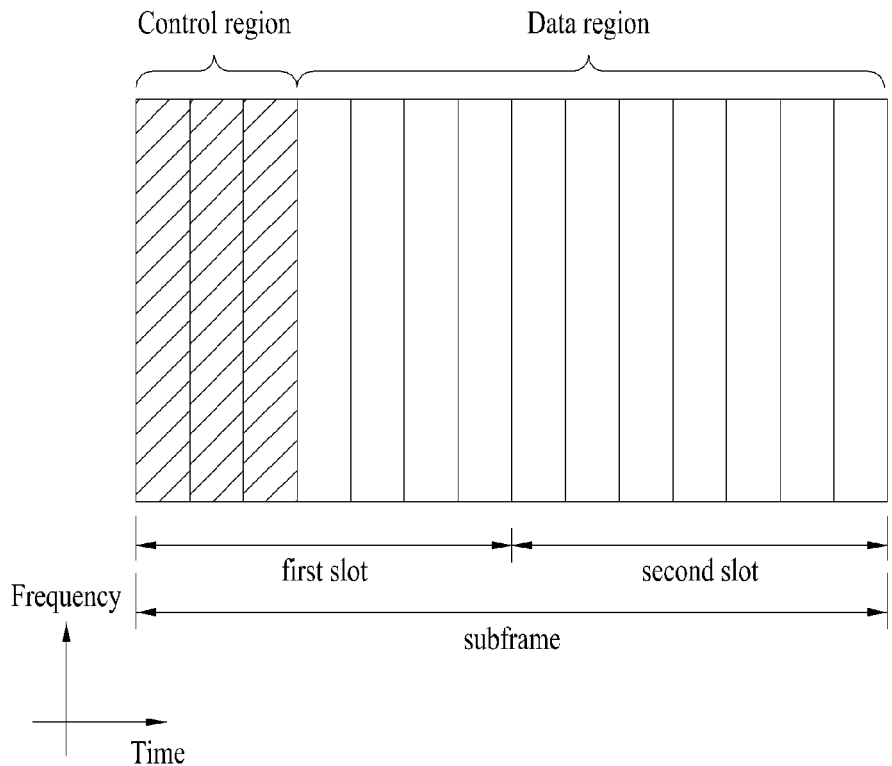
FIG. 3 illustrates a structure of a downlink frame.

FIG. 3 illustrates a structure of a DL subframe.

Referring to FIG. 3, up to three or four OFDM symbols at the start of the first slot of a DL subframe are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a Physical Downlink Control Channel (PDCCH), and a Physical Hybrid ARQ Indicator Channel (PHICH). The PCFICH is located in the first OFDM symbol of a subframe, carrying information about the number of OFDM symbols used for transmission of control channels in the subframe. The PHICH delivers an HARQ ACK/NACK signal as a response to a UL transmission.

Control information carried on the PDCCH is called Downlink Control Information (DCI). The DCI transports resource allocation information and other control information for a UE or a UE group. For example, the DCI includes DL/UL scheduling information, UL Transmission (Tx) power control commands, etc.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, Tx power control commands, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the number of CCEs. An eNB determines a PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a random access response to a random access preamble transmitted by a UE, its CRC may be masked by a Random Access-RNTI (RA-RNTI).

Figure 4:
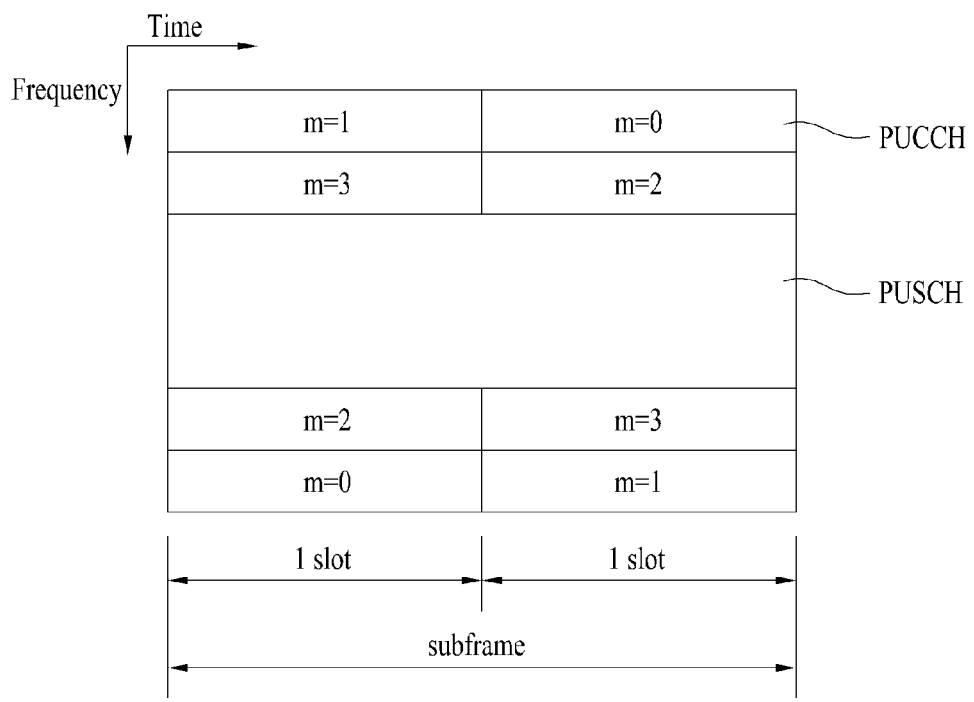
FIG. 4 illustrates a structure of an uplink subframe.

FIG. 4 illustrates a structure of a UL subframe in the 3GPP LTE system.

Referring to FIG. 4, a UL subframe includes a plurality of (e.g. 2) slots. A slot may include a different number of SC-FDMA symbols according to a CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region on a frequency axis and the RB pair frequency-hops over a slot boundary.

The PUCCH may deliver the following control information.

SR: information requesting UL-SCH resources. An SR is transmitted in On-Off Keying (OOK).

HARQ ACK/NACK: a response signal to a DL data packet received on a PDCCH, indicating whether the DL data packet has been received successfully. A 1-bit ACK/NACK is transmitted as a response to a single DL codeword and a 2-bit ACK/NACK is transmitted as a response to two DL codewords.

CSI: feedback information regarding a DL channel. CSI includes a CQI and Multiple Input Multiple Output (MIMO)-related feedback information includes an RI, a PMI, a Precoding Type Indicator (PTI), etc. The CSI occupies 20 bits per subframe.

The amount of UCI that the UE may transmit in a subframe depends on the number of SC-FDMA symbols available for transmission of control information. The remaining SC-FDMA symbols except SC-FDMA symbols allocated to RSs in a subframe are available for transmission of control information. If the subframe carries a Sound Reference Signal (SRS), the last SC-FDMA symbol of the subframe is also excluded in transmitting the control information. The RSs are used for coherent detection of the PUCCH.

Embodiment 1

In an embodiment of the present invention, the configuration of a special subframe interposed between DL subframes and UL subframes in a TDD system is dynamically controlled. Particularly, the dynamic control of the configuration of a special subframe advantageously enables flexible use of the special subframe for DL transmission or UL transmission according to a traffic state.

The dynamic control of a special subframe configuration may be indicated to a UE by UE-specific RRC signaling or by Layer 1/Layer 2 (L1/L2) control signaling such as a PDCCH. In the case of L1/L2 signaling, a reserved state of a DL HARQ process number field in UL assignment information may be used to indicate a special subframe configuration. Or an eNB may use RRC signaling and L1/L2 signaling in combination. That is, the eNB indicates a few special subframe configuration candidates to the UE by RRC signaling and then indicates a special subframe configuration to be used to the UE by L1/L2 control signaling.

An exemplary operation proposed by the present invention is performed as follows.

1) First, the eNB sets a short DwPTS length for legacy UEs and transmits information about the short DwPTS length by broadcast information such as a PBCH or an SIB. Then the legacy UEs determine the existence of a relatively long GP in the middle of a special subframe and expect no transmission/reception during the GP. Accordingly, the eNB may use the region corresponding to the GP for DL transmission or UL transmission without affecting operations of the legacy UEs.

2) If the eNB uses a special subframe for DL transmission, the eNB configures a long DwPTS for the special subframe and maps a PDSCH to the DwPTS. Or after the eNB predefines a corresponding special subframe configuration by an SIB or UE-specific RRC signaling, if a UE detects DL assignment information in the special subframe, the UE detects a PDSCH.

3) If the eNB uses a special subframe for UL transmission, particularly PUSCH transmission, the eNB configures a long UpPTS for the special subframe and maps a PUSCH to the UpPTS. For this purpose, a special subframe configuration with a long UpPTS (i.e. a UpPTS occupying a large number of symbols in a subframe) should be added to current special subframe configurations.

Figure 5:
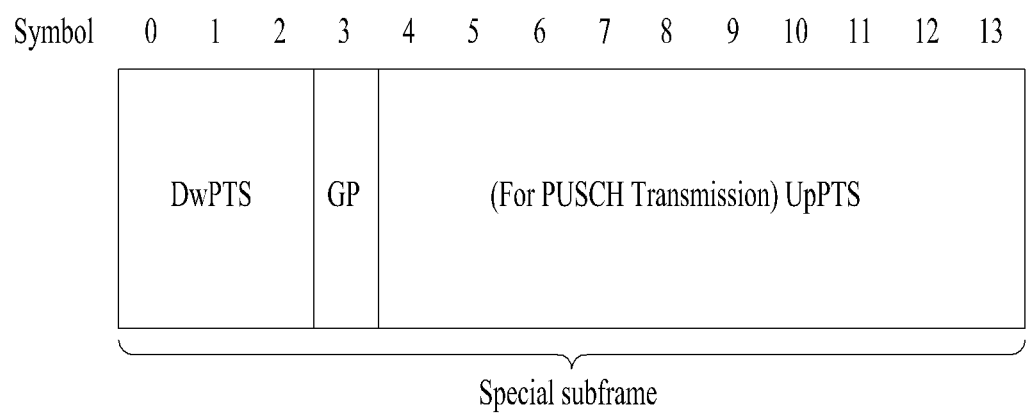
FIG. 5 illustrates an example of dynamically controlling the configuration of a special subframe according to an embodiment of the present invention.

FIG. 5 illustrates an example of dynamically controlling a special subframe configuration according to an embodiment of the present invention. Specifically, it is assumed in the illustrated case of FIG. 5 that a subframe includes 14 symbols in total, with 3 symbols to a DwPTS, 1 symbol to a GP, and 10 symbols to a UpPTS.

Aside from the special subframe configuration illustrated in FIG. 5, many other configurations are available to a special subframe, inclusive of a configuration with the first 2 symbols for the DwPTS and the last 11 symbols for the UpPTS.

If the afore-described subframe structure is used, some starting symbols of a subframe are not available for PUSCH transmission. To avert this problem, the present invention proposes that some symbols before a PUSCH transmitted in a special subframe are rate-matched or punctured.

Especially, the eNB may indicate the index of the starting symbol of the PUSCH to a UE by higher-layer signaling such as RRC signaling. Or the UE may determine the transmission time point of the PUSCH based on a minimum DwpTS length assumed for a corresponding subframe (when needed, one or more symbols are additionally allocated to a GP).

The minimum DwPTS length may be determined to 3 symbols as in the above special subframe configuration and may be indicated by higher-layer signaling such as RRC signaling. Or the minimum DwPTS length may be indicated by the PCFICH of the corresponding special subframe. Or the minimum DwPTS length may be determined according to the number of Cell specific Reference Signal (CRS) antenna ports used in the eNB. For example, if there are one or two CRS antenna ports, a CRS is transmitted only in the first symbol and thus the minimum DwPTS length may be one symbol. On the other hand, if the eNB has four CRS antenna ports, a CRS is transmitted in the first two symbols and thus the minimum DwPTS length may be two symbols.

Further, the minimum DwPTS length may be determined according to the position of a subframe. That is, in the case of a UL/DL subframe configuration with a DL-to-UL switch period of 5 ms, subframe #1 and subframe #6 serve as special subframes. While a synchronization signal should be transmitted in symbol #2 of subframe #1, the constraint may not be imposed on subframe #6. Accordingly, the minimum DwPTS length is always set to three symbols in subframe #1, whereas the minimum DwPTS length may be set to one or two symbols in subframe #6 without the constraint by higher-layer signaling or the PCFICH, or according to the number of CRS antenna ports.

If the GP occupies one symbol, the PUSCH may be transmitted, starting from a symbol corresponding to the minimum DwPTS length may be +1. It is assumed herein that the first symbol of a subframe is symbol #0.

If a PUSCH is transmitted in a special subframe, a subframe carrying a UL grant that schedules the PUSCH should be determined. Although the UL grant may be transmitted in the special subframe, the UE may not prepare for PUSCH transmission during a time period from reception of the UL grant to the PUSCH transmission. To solve the problem, the eNB may transmit the UL grant in a previous specific subframe so that the UE may interpret the UL grant as scheduling PUSCH transmission in a special subframe.

The specific subframe may be one of (1) the closest of previous special subframes, (2) the closest of previous DL subframes which are 3 ms earlier, and (3) the closest of previous DL subframes which do not carry a UL grant.

For the above operation, neighbor cells may exchange special subframe configuration information via wired/wireless communication links. Particularly, the information exchange is helpful to overcome interference generated when a neighbor cell performs UL reception in the same special subframe as used for DL transmission of a cell.

Specifically, information indicating whether a special subframe configuration is dynamically controlled and information indicating a range in which a DwPTS or a UpPTS is changed may be exchanged. Upon receipt of the information, an eNB may configure its special subframe based on special subframe configurations of neighbor cells.

Or a specific cell may notify neighbor cells that the specific cell experiences severe interference with UL reception or DL transmission in a special subframe and thus may request the neighbor cells to reduce transmission power in the special subframe.

Embodiment 2

The concept of Enhanced-PDCCH (E-PDCCH) has recently been proposed to overcome PDCCH performance degradation caused by inter-cell interference or resource shortage for PDCCH.

Figure 6:
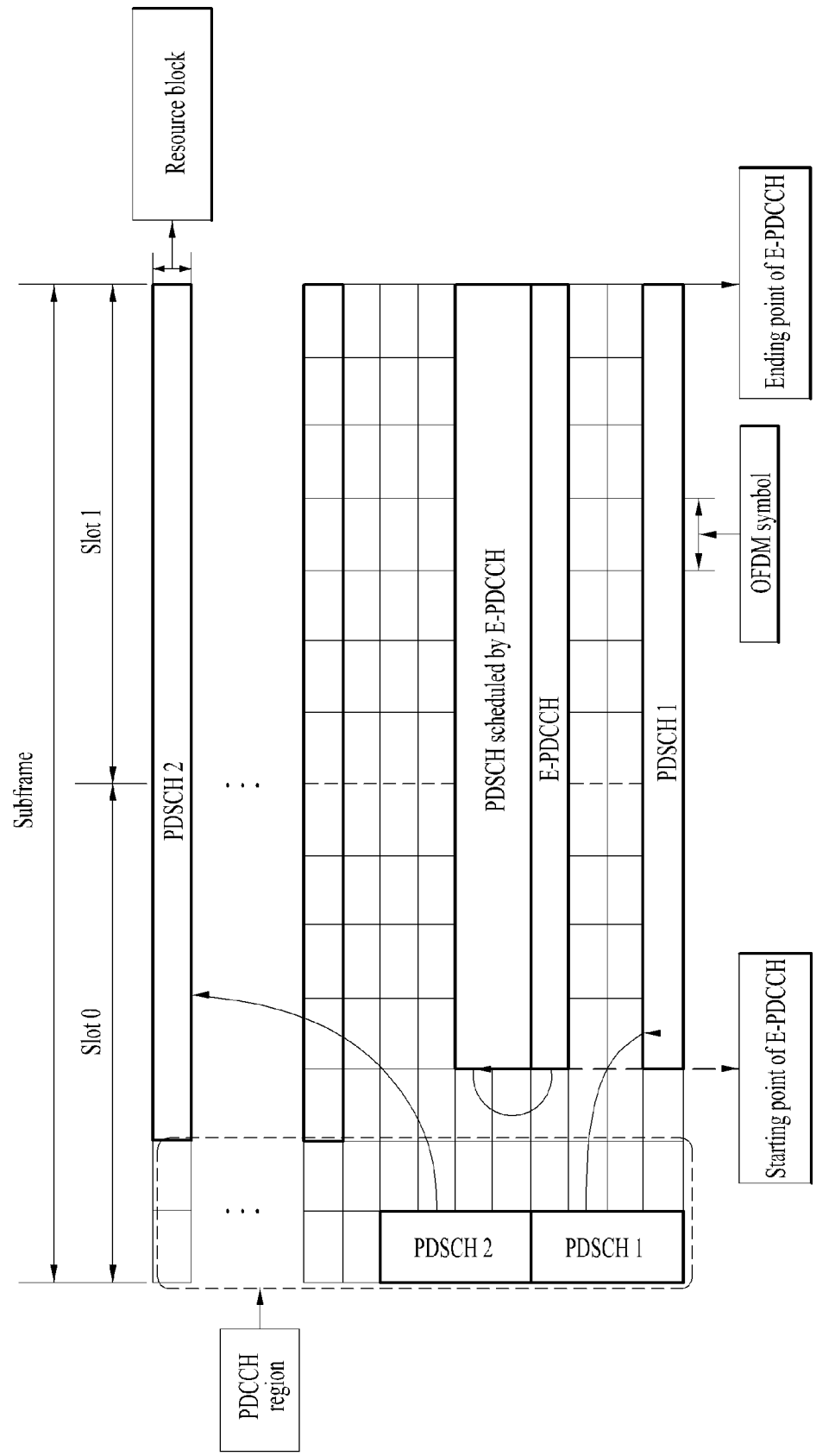
FIG. 6 illustrates the concept of Enhanced-Physical Downlink Control Channel (E-PDCCH)

FIG. 6 illustrates the concept of E-PDCCH. Specifically, a conventional PDCCH and a PDSCH allocated by the conventional PDCCH are compared with an E-PDCCH and a PDSCH allocated by the E-PDCCH in FIG. 6.

The frequency-domain length and time-domain length of the E-PDCCH may be set to be different. Particularly, an eNB may transmit information about the time-domain length of the E-PDCCH, that is, information about the starting and ending symbols of the E-PDCCH to a UE by higher-layer signaling or a specific field of a PDCCH. For example, the starting and ending symbols of the E-PDCCH are set to the fourth symbol of the first slot and the last symbol of the second slot, respectively in the illustrated case of FIG. 6. While not shown in FIG. 6, the E-PDCCH may end in the middle symbol of a subframe (e.g. the last symbol of the first slot).

If DL assignment information and a UL grant are transmitted together in every subframe, the total number of resources used for E-PDCCH transmission may be kept relatively uniform in every subframe. However, DL assignment information is transmittable but it is not necessary to transmit a UL grant in some cases, as is observed in some subframes of a TDD system. This is because there is not a UL subframe to carry a PUSCH scheduled by a certain DL subframe in a UL/DL subframe configuration with more DL subframes than UL subframes.

In another embodiment of the present invention, the number of E-PDCCH transmission resources is controlled depending on whether a UL grant can be transmitted in a specific DL subframe.

That is, an E-PDCCH is transmitted with many resources (e.g. PRBs) in a subframe carrying DL assignment information and a UL grant, whereas an E-PDCCH is transmitted with a small number of resources in a subframe carrying only DL assignment information without a UL grant.

E-PDCCH transmission resources may be represented as a set of PRBs configured as an E-PDCCH search space. The eNB may divide a whole subframe into a plurality of groups and indicate a set of PRBs for each group by additional higher-layer signaling. Or after setting a PRB set for one group, a PRB set for another group may be set according to a predetermined rule (e.g. a rule of selecting odd-numbered or even-numbered PRBs). In the operation for dividing a subframe into a plurality of groups and using different PRB sets for the groups, the grouping may be performed implicitly according to whether a UL grant is transmitted or grouping information may indicated explicitly by higher-layer signaling by the eNB.

This method is effective especially to an interleaving mode in which an E-PDCCH directed to a UE is divided into a plurality of units (e.g. REGs), cross-interleaved with other E-PDCCHs, and transmitted across a plurality of PRBs. If even one RE of a specific PRB is used for an E-PDCCH in the interleaving mode, other UEs do not know the existence of the E-PDCCH and thus have limitations in using the PRB.

Accordingly, it is proposed that a set of PRBs carrying a cross-interleaved E-PDCCH in a subframe is controlled depending on whether a UL grant can exist in the subframe in the interleaving mode. That is, transmission of a cross-interleaved E-PDCCH is limited to a smaller number of PRBs in a subframe that does not carry a UL grant, thereby using the remaining PRBs for a usage such as PDSCH transmission.

Figure 7:
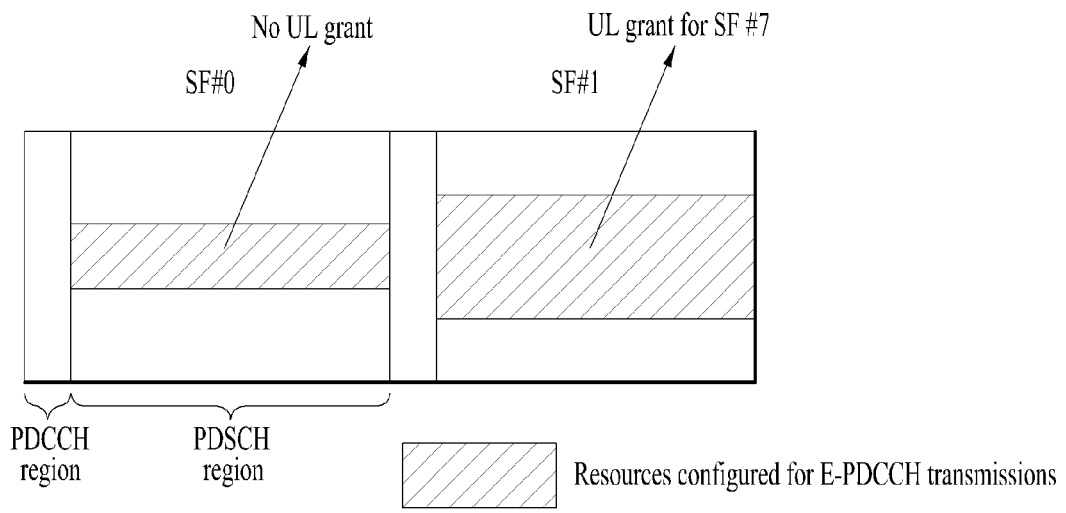
FIG. 7 illustrates an example of transmitting an E-PDCCH according to another embodiment of the present invention.

FIG. 7 illustrates an example of transmitting an E-PDCCH according to another embodiment of the present invention. Specifically, FIG. 7 is based on the assumption of UL/DL subframe configuration 1 for a TDD system.

Referring to FIG. 7, since a UL grant is not delivered in subframe #0, a smaller number of resources are allocated for E-PDCCH transmission. In contrast, more resources are allocated for E-PDCCH transmission in subframe #1 because a UL grant for subframe #7 is transmitted in subframe #1.

The principle of the present invention may be applied by allocating E-PDCCH transmission resources according to the DwPTS length of a special subframe. As noted from [Table 1], the length of a DwPTS that carries a PDSCH may be changed according to a GP length.

If the DwPTS is relatively short, available resources are reduced in terms of OFDM symbols. Therefore, a smaller number of UEs are likely to be scheduled and thus an E-PDCCH can be transmitted with a smaller number of resources. Or if as many resources are needed for UL grant transmission, more PRB pairs should be used for E-PDCCH transmission. For an adaptive operation to this situation, the size of E-PDCCH transmission resources in a special subframe is preferably set to be different from in a general DL subframe in the present invention.

As described before, a subframe may be divided into a plurality of groups and different PRB sets may be used for E-PDCCH transmission in the groups. The grouping may be performed implicitly according to whether the subframe is a special subframe, the length of a DwPTS, or the number of OFDM symbols available for E-PDCCH transmission. Or grouping information may be indicated explicitly by higher-layer signaling by an eNB.

Figure 8:
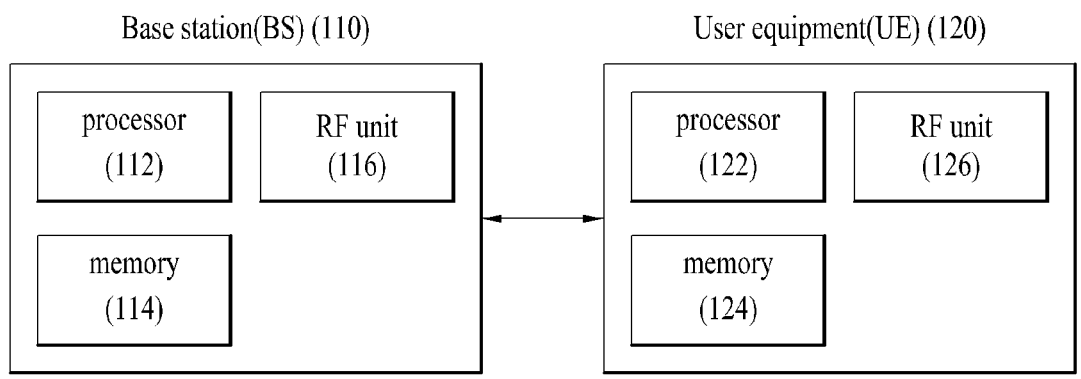
FIG. 8 is a block diagram of a Base Station (BS) and a User Equipment (UE) that are applicable to embodiments of the present invention.

FIG. 8 is a block diagram of a BS and a UE that are applicable to embodiments of the present invention. If Relay Nodes (RNs) are included in a wireless communication system, backhaul link communication takes place between a BS and an RN and access link communication takes place between an RN and a UE. Accordingly, the BS or the UE may be replaced with the RN under circumstances in FIG. 8.

Referring to FIG. 8, a wireless communication system includes a BS 110 and a UE 120. The BS 110 includes a processor 112, a memory 114, and a Radio Frequency (RF) unit 116. The processor 112 may be configured to perform the proposed procedures and/or methods according to the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a UE, an RN, an eNB, etc.

The invention claimed is:

1. A method for transceiving a signal with a Base Station (BS) at a User Equipment (UE) in a wireless communication system, the method comprising:

configuring, by the UE, a default configuration of a specific subframe;

determining, by the UE, which one of an uplink signal transmission or a downlink signal reception is scheduled in the specific subframe;

receiving, by the UE, information about a dynamic configuration of the specific subframe from the BS; and performing, by the UE, the downlink signal reception from the BS in the specific subframe or performing, by the UE, the uplink signal transmission to the BS in the specific subframe, according to a result of the determining, wherein a first period for the downlink signal reception is positioned at the start of the specific subframe and a second period for the uplink signal transmission is positioned at the end of the specific subframe, wherein the default configuration and the dynamic configuration of the specific subframe define both a size of the first period in the specific subframe and a size of the second period in the specific subframe, wherein the sizes of the first and second periods in the dynamic configuration are varied according to which one of the uplink signal transmission or the downlink signal reception is scheduled in the specific subframe, wherein another UE is configured with a predetermined configuration of the specific subframe, the predetermined configuration of the specific subframe defining a third period for which downlink transmission and uplink transmission are not expected for the another UE, and wherein at least a portion of the third period is scheduled concurrently with the determined downlink signal reception or the determined uplink signal transmission.

2. The method according to claim 1, wherein the specific subframe includes a Downlink Pilot Time Slot (DwPTS), a Guard Period (GP), and an Uplink Pilot Time Slot (UpPTS), and wherein the first period is the DwPTS and the second period is the UpPTS.

3. The method according to claim 2, wherein a size of the GP is fixed to one symbol.

4. A User Equipment (UE) in a wireless communication system, the UE comprising:

a wireless communication module configured to transceive a signal with a Base Station (BS); and a processor configured to process the signal, wherein the processor configures a default configuration of a specific subframe and makes a determination as to which one of an uplink signal transmission or a downlink signal reception is scheduled in the specific subframe, wherein the wireless communication module receives information about a dynamic configuration of the specific subframe from the BS, and the processor controls the wireless communication module to perform the downlink signal reception from the BS in the specific subframe or to perform the uplink signal transmission to the BS in the specific subframe according to a result of the determination, wherein a first period for downlink signal reception is positioned at the start of the specific subframe, and a second period for uplink signal transmission is positioned at the end of the specific subframe, wherein the default configuration and the dynamic configuration of the specific subframe defines both a size of the first period in the specific subframe and a size of the second period in the specific subframe, wherein the sizes of the first and second periods in the dynamic configuration are varied according to which one of the uplink signal transmission or the downlink signal reception is scheduled in the specific subframe, and wherein another UE is configured with a predetermined configuration of the specific subframe, the predetermined configuration of the specific subframe defining a third period for which downlink transmission and uplink transmission are not expected for the another UE, and wherein at least a portion of the third period is scheduled concurrently with the determined downlink signal reception or the determined uplink signal transmission.

5. The UE according to claim 4, wherein the specific subframe includes a Downlink Pilot Time Slot (DwPTS), a Guard Period (GP), and an Uplink Pilot Time Slot (UpPTS), and wherein the first period is the DwPTS and the second period is the UpPTS.

6. The UE according to claim 5, wherein a size of the GP is fixed to one symbol.

* * * * *